US008472812B2

(12) United States Patent  
Shioiri et al.

(10) Patent No.: US 8,472,812 B2  
(45) Date of Patent: Jun. 25, 2013

(54) OPTICAL COMMUNICATION SYSTEM, OPTICAL COMMUNICATION METHOD AND OPTICAL COMMUNICATION APPARATUS

(75) Inventors: Satomi Shioiri, Tokyo (JP); Toshiharu Ito, Tokyo (JP); Kiyoshi Fukuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 209 days.

(21) Appl. No.: 12/918,730

(22) PCT Filed: Feb. 18, 2009

(86) PCT No.: PCT/JP2009/052746  
§ 371 (c)(1),  
(2), (4) Date: Aug. 20, 2010

(87) PCT Pub. No.: WO2009/104631  
PCT Pub. Date: Aug. 27, 2009

(65) Prior Publication Data  
US 2010/0329690 A1    Dec. 30, 2010

(30) Foreign Application Priority Data

Feb. 22, 2008   (JP) ................................. 2008-040867

(51) Int. Cl.  
*H04B 10/04*   (2006.01)

(52) U.S. Cl.  
USPC ........... 398/188; 398/202; 398/183; 398/212; 398/213; 398/208; 398/209; 398/205; 398/206; 398/207; 398/45

(58) Field of Classification Search  
USPC ............... 398/182, 183, 186, 188, 187, 192, 398/193, 194, 195, 196, 197, 198, 199, 200, 398/201, 158, 159, 202, 204, 205, 206, 207, 398/208, 209, 212, 213, 214, 154, 155, 185  
See application file for complete search history.

(56) References Cited

U.S. PATENT DOCUMENTS 7,720,392 B2 * 5/2010 Nakashima et al. .......... 398/198  
2008/0080872 A1 * 4/2008 Tanaka et al. ................. 398/186

FOREIGN PATENT DOCUMENTS

JP    11-331089 A    11/1999  
JP    2004-170954 A    6/2004

(Continued)

OTHER PUBLICATIONS

R.A. Griffin et al., "Optical Differential Quadrature Phase-Shift Key (oDQPSK) for High Capacity Optical Transmission", Optical Fiber Communication Conference and Exhibit, Mar. 2003, pp. 367-368, WX6, USA.

*Primary Examiner* — Hanh Phan  
(74) *Attorney, Agent, or Firm* — Sughrue Mion, PLLC

(57) ABSTRACT

Transmission-side communication apparatus 100 using a DQPSK (differential quadrature phase-shift keying) scheme is provided with: optical carrier generation section 102 which generates an optical carrier the frequency of which switches among a plurality of different frequencies within one symbol period; and modulation section 103 with which DQPSK-modulates the optical carrier generated by the optical carrier generation means in accordance with a modulation signal at an interval of the symbol period. There are provided: single delay interference section 121 which receives an optical signal obtained by DQPSK-modulating an optical carrier the frequency of which switches among a plurality of different frequencies within one symbol period and outputs an output light obtained by causing the optical signal 104 and a delay optical signal thereof to interfere with each other; and photoelectric conversion section 124 which converts the output light outputted by the delay interference means to an electric signal.

25 Claims, 13 Drawing Sheets

FOREIGN PATENT DOCUMENTS

| | | |
|---|---|---|
| JP | 2004-516743 A | 6/2004 |
| JP | 2006-050614 A | 2/2006 |
| JP | 2006-203886 A | 8/2006 |

* cited by examiner

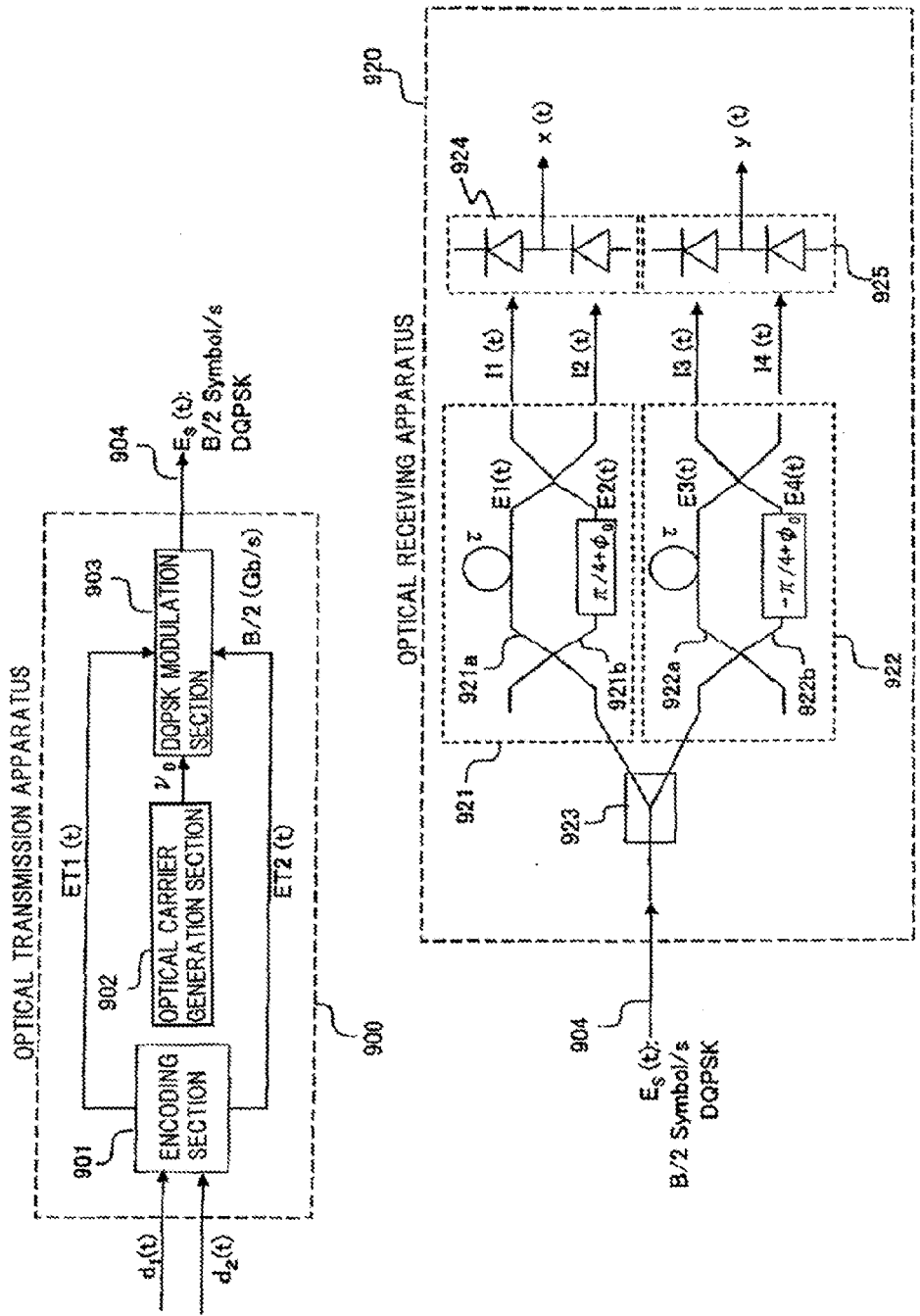

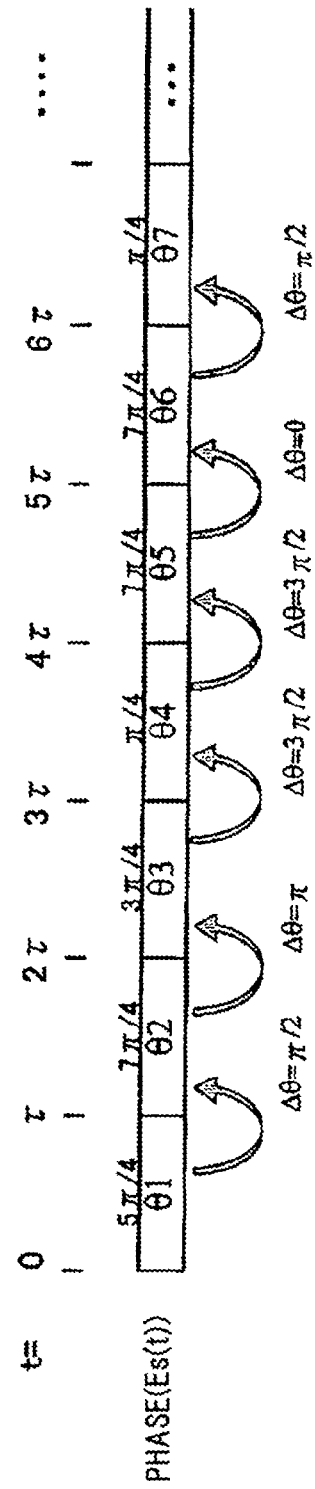

Fig.5B

DEMODULATED SIGNAL STRING(Rx)    $z(t) =$ | x1 | y1 | x2 | y2 | x3 | y3 | x4 | ... |

Fig.7
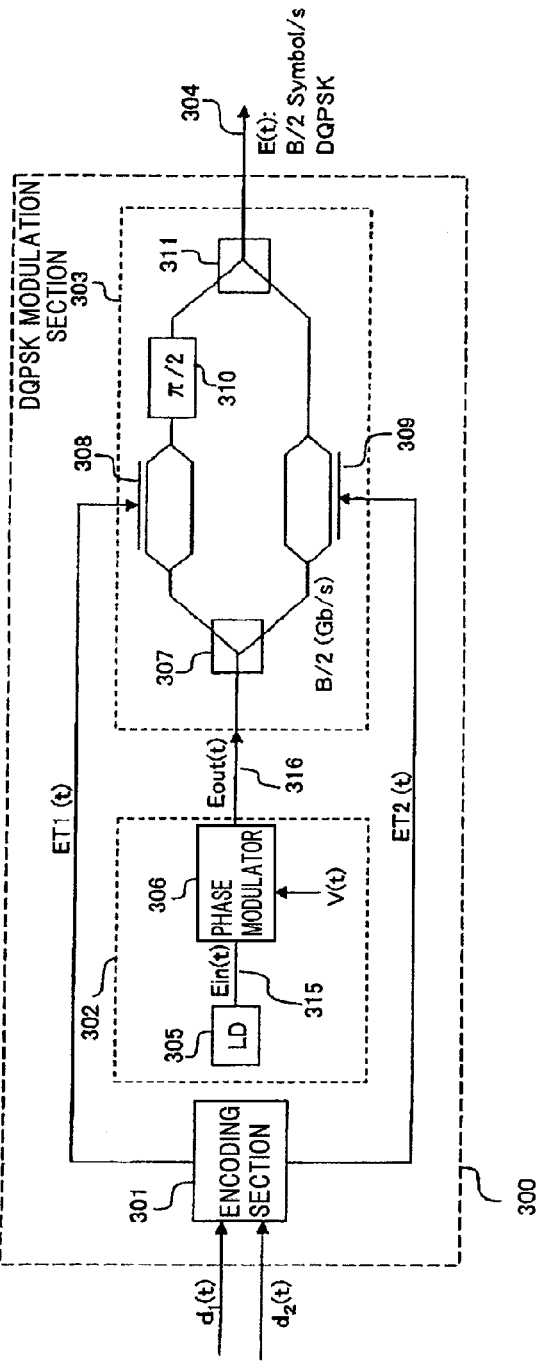
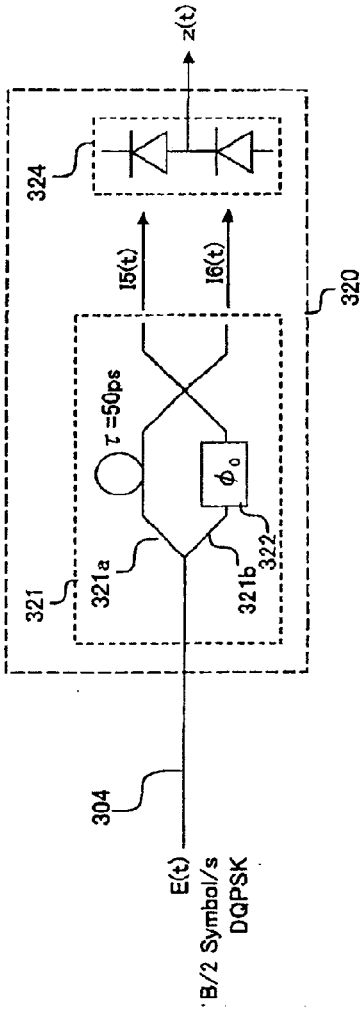

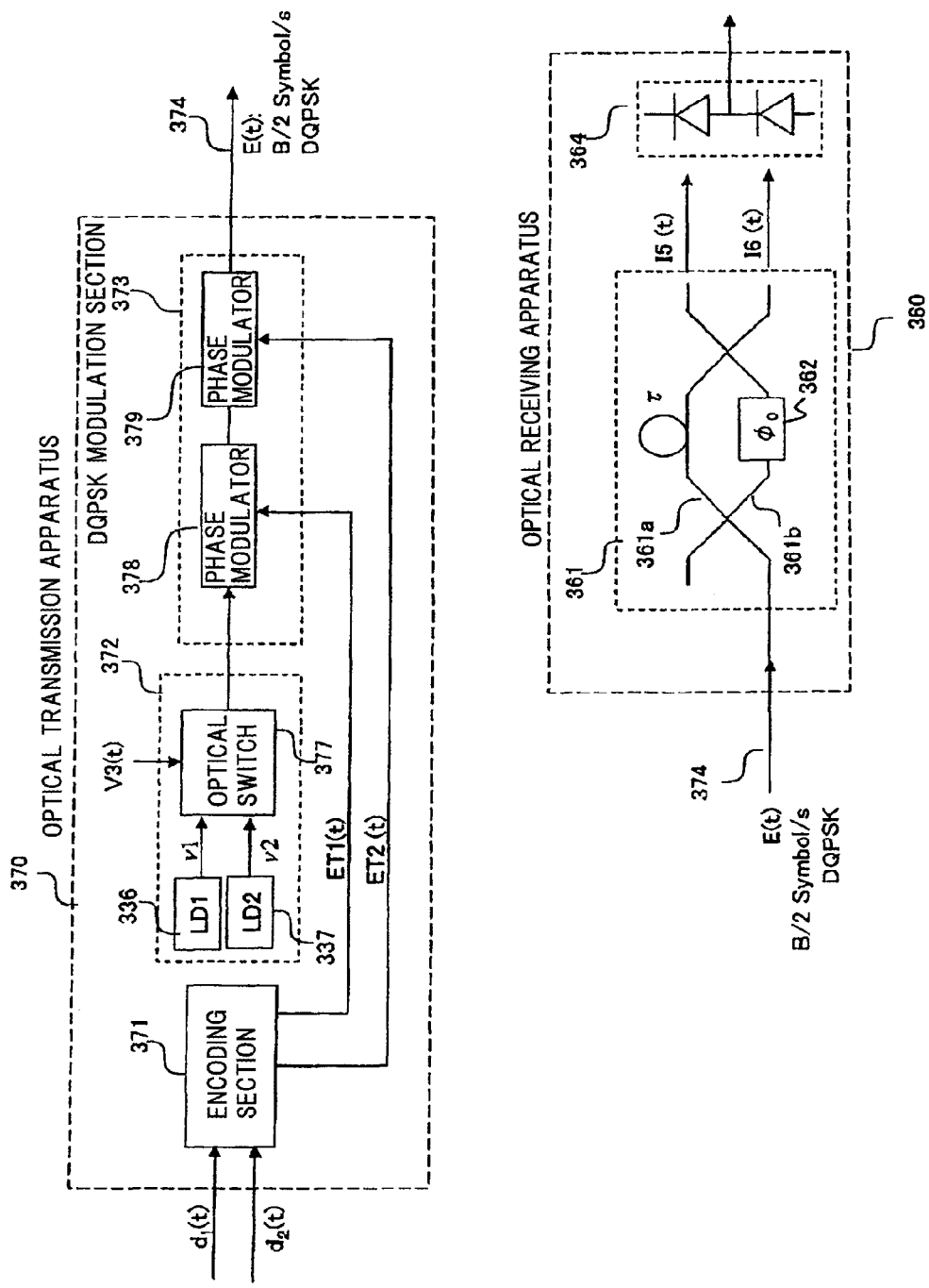

OPTICAL COMMUNICATION SYSTEM, OPTICAL COMMUNICATION METHOD AND OPTICAL COMMUNICATION APPARATUS

TECHNICAL FIELD

The present invention relates to an optical communication system, and in particular to an optical communication method and apparatus using DQPSK (differential quadrature phase-shift keying) as a modulation/demodulation scheme, and an optical communication system using the method and apparatus.

BACKGROUND ART

As described in "Optical Differential Quadrature Phase-Shift Key (oDQPSK) for High Capacity Optical Transmission" by R. A. Griffin et al., Optical Fiber Communication Conference and Exhibit, USA. March 2003, WX6, pp. 367-368, the DQPSK scheme is a modulation scheme excellent in wavelength usage efficiency, wavelength dispersion tolerance and polarized wave dispersion tolerance, and application to various optical communication systems requiring these advantages is proposed (for example, JP2004-516743A). The configuration and operation of a general DQPSK optical communication system will be described below with reference to FIGS. 1 to 3, with an optical transmission apparatus and optical receiving apparatus using the DQPSK modulation scheme, which are disclosed in Patent Document 1, as an example.

FIG. 1 is a block diagram showing a configuration example of a modulation section of a general optical transmission apparatus and a demodulation section of a general optical receiving apparatus. FIG. 2A is a signal constellation diagram showing the phase state of general DQPSK optical transmission signal Es(t). FIG. 2B is a time chart showing an example of phase variation of general DQPSK optical transmission signal Es(t). FIG. 3 is a time chart showing DQPSK optical transmission signal Es(t) and demodulated signal Rx.

In FIG. 1, optical transmission apparatus 900 is provided with DQPSK encoding section 901, optical carrier generation section 902 and DQPSK modulation section 903. In optical carrier generation section 902, a laser diode is usually used as a CW (continuous wave) light source.

Optical receiving apparatus 920 is provided with optical splitter 923, delay interferometers 921 and 922, and balancing-type photoelectric converters 924 and 925. Delay interferometer 921 is provided with arm 921a having an optical transmission path for making delay time $\tau$ and arm 921b for fixedly giving a $\pi/4$ phase shift and, when necessary, for fixedly giving fine-adjustment phase $\Phi_0$. Delay interferometer 922 is provided with arm 922a having an optical transmission path for making delay time $\tau$ and arm 922b for fixedly giving a $-\pi/4$ phase shift and, when necessary, for fixedly giving fine-adjustment phase $\Phi_0$.

In optical transmission apparatus 900, optical carrier generation section 902 generates an optical carrier with frequency $v_0$ and outputs it to DQPSK modulation section 903. DQPSK modulation section 903 phase-modulates the optical carrier with frequency $v_0$ any of four values located at an interval of $\pi/4$ as shown in FIG. 2A, in accordance with signals ET1 and ET2 to generate DQPSK signal Es(t). DQPSK encoding section 901 performs encoding of transmitted data d1 and d2 corresponding to DQPSK modulation and outputs encoded signals ET1 and ET2 to DQPSK modulation section 903.

As shown in FIGS. 2A and 2B, phase $\theta$ of an optical signal is any of [$\pi/4, 3\pi/4, 5\pi/4, 7\pi/4$] for each symbol. The original signal has been encoded by DQPSK encoding section 901 and mapped to $\Delta\theta$ which is the phase difference between a signal and the immediately previous signal. $\Delta\theta$ is any of the four values of [$0, \pi/2, \pi, 3\pi/2$]. Since transmission signal Es(t) is a signal obtained by modulating optical carrier frequency $v_0$ with phase information $\theta(t)$, it can be expressed by the following expression (1).

[Expression 1]

$$Es(t) = \exp\{i[2\pi v_0 t + \theta(t)]\} \quad (1)$$

Here, $\theta(t)$ takes any of the values of [$\pi/4, 3\pi/4, 5\pi/4, 7\pi/4$]. Since each symbol has four values, that is, 2-bit information, the symbol rate is B/2 [symbols/s] and the symbol interval is $\tau=2/B$ [seconds] for transmission capacity B [bits/s].

When optical signal Es(t) expressed by the above expression (1) arrives, it is separated into two optical signals by optical splitter 923 of optical receiving apparatus 920. One is sent to delay interferometer 921, and the other to delay interferometer 922. The operation of delay interferometer 921 will be described below as an example.

Delay interferometer 921 further branches the inputted optical signal into two, delays one by $\tau$ at arm 921a, and phase-shifts the other by $\pi/4$ at arm 921b. By delaying one optical signal by $\tau$, it is possible to cause the other optical signal to interfere with an optical signal before one symbol interval the signals and extract phase difference $\Delta\theta(t)=\theta(t)-\theta(t-\tau)$. Two optical signals E1(t) and E2(t) before the interference can be expressed by the following expressions (2).

[Expression 2]

$$E1(t) = e^{i\frac{\pi}{2}} \exp\{i[2\pi v_0(t-\pi) + \theta(t-\tau)]\}$$
$$E2(t) = \exp\{i[2\pi v_0(t) + \phi_0 + \theta(t) + \frac{\pi}{4}]\} \quad (2)$$

Here, $\Phi_0$ is a fine-adjustment phase term for, when causing an optical carrier with frequency $v_0$ to interfere $\tau$ hours before with a carrier, aligning the phases of both carriers. Adjustment can be performed with the use of a phase modulator for $\pi/4$ shift.

When two optical signals E1(t) and E2(t) are caused to interfere with each other, strengths I1(t) and I2(t) of the optical signals outputted from delay interferometer 921 can be expressed by the following expressions (3).

[Expression 3]

$$I1 = |E1(t) + e^{i\frac{\pi}{2}} E2(t)|^2 \propto 1 + \cos(2\pi v_0 \tau + \phi_0 + \Delta\theta + \frac{\pi}{4})$$
$$I2 = |e^{i\frac{\pi}{2}} E1(t) + E2(t)|^2 \propto 1 - \cos(2\pi v_0 \tau + \phi_0 + \Delta\theta + \frac{\pi}{4}) \quad (3)$$

Therefore, the difference signal therebetween is expressed by the following expression (4).

[Expression 4]

$$I1 - I2 \propto 2\cos(2\pi v_0 \tau + \phi_0 + \Delta\theta + \frac{\pi}{4}) \quad (4)$$

When $\Phi_0$ is adjusted to align the phase with that of a carrier before one symbol interval the signals, the following expression (5) is satisfied.

[Expression 5]

$$2\pi v_0 \tau + \Phi_0 = 2\pi N \text{ (}N\text{ is an integer.)} \quad (5)$$

Therefore, the following expression (6) is obtained from expressions (4) and (5).

[Expression 6]

$$I1(t) - I2(t) \propto \cos\left(\Delta\theta(t) + \frac{\pi}{4}\right) \quad (6)$$

Therefore, electrical signal x(t) expressed by the following expression (7) is obtained by square-law detecting two optical signals I1 and I2 by balancing-type photoelectric converter 924.

[Expression 7]

$$x(t) \propto I1(t) - I2(t) \propto \cos\Delta\theta(t) - \sin\theta(t) = \begin{cases} 1 & \text{for } \Delta\theta(t) = 0, \frac{3\pi}{2} \\ -1 & \text{for } \Delta\theta(t) = \frac{\pi}{2}, \pi \end{cases} \quad (7)$$

Similarly, since delay interferometer 922 causes interference with what is obtained by phase-shifting a signal of shorter arm 922b by $-\pi/4$, the difference signal therebetween, I3(t)–I4(t), is expressed by the following expression (8).

[Expression 8]

$$I3(t) - I4(t) \propto \cos\left(2\pi v_0 \tau + \phi_0 + \Delta\theta(t) - \frac{\pi}{4}\right) \quad (8)$$

Since expression (5) is satisfied, electrical signal y(t) expressed by the following expression (9) is obtained by square-law detecting two optical signals I3 and I4 by balancing-type photoelectric converter 925.

[Expression 9]

$$y(t) \propto I3(t) - I4(t) \propto \cos\Delta\theta(t) + \sin\theta(t) = \begin{cases} 1 & \text{for } \Delta\theta(t) = 0, \frac{\pi}{2} \\ -1 & \text{for } \Delta\theta(t) = \frac{3\pi}{2}, \pi \end{cases} \quad (9)$$

An example of output from balancing-type photoelectric converters 924 and 925 described above is shown in FIG. 3. At DQPSK encoding section 901 on the transmission side, it is encoded so that electrical signals x(t) and y(t) obtained on the receiving side correspond to the original signals (signals d1 and d2 before encoding on the transmission side).

DISCLOSURE OF THE INVENTION

In the DQPSK communication system described above, however, two sets of optical modules (optical parts), such as delay interferometers 921 and 922 and balancing-type photoelectric converters 924 and 925, are required for DQPSK demodulation, as illustrated in FIG. 1, which results in increase in the number of parts of the receiving side apparatus, an increasing in the complexity of the configuration, an increase in power consumption, and difficulty in miniaturization. In particular, since the optical demodulation circuit described above is configured by assembling optical parts, a large number of parts causes the production process to become complicated, and thus the effect of lowering manufacturing costs through mass production, like that of a semiconductor integrated circuit, cannot be expected.

Accordingly, the object of the present invention is to provide an optical communication method and apparatus capable of realizing simplification and miniaturization of the configuration of the receiving side apparatus.

An optical communication system of the present invention is an optical communication system using a DQPSK (differential quadrature phase-shift keying) system including: a transmission-side communication apparatus generating an optical carrier the frequency of which switches among a plurality of different frequencies within one symbol period and DQPSK-modulating the optical carrier according to a modulation signal at an interval of the symbol period; and a receiving-side communication apparatus receiving an optical signal DQPSK-modulated by the transmission-side communication apparatus, causing the received optical signal and a delay optical signal delayed by a predetermined time relative to the optical signal to interfere with each other, and converting the optical signals that were caused to interfere with each other to electrical signals.

According to the present invention, it is possible to simplify the configuration of an optical receiving apparatus and facilitate miniaturization. The reason is that a DQPSK-modulated signal can be demodulated only by providing one delay interference section and one photoelectric conversion section.

BRIEF DESCRIPTION OF THE DRAWINGS

FIG. 1 is a block diagram showing a configuration example of a modulation section of a general optical transmission apparatus and a demodulation section of a general optical receiving apparatus;

FIG. 2B is a time chart showing an example of phase variation of general DQPSK optical transmission signal Es(t);

FIG. 5B is a time chart schematically showing a demodulation result on the receiving side;

FIG. 7 is a block diagram showing an optical communication system according to a first exemplary embodiment;

FIG. 11 is a block diagram showing an optical communication system according to a third exemplary embodiment.

BEST MODE FOR CARRYING OUT THE INVENTION

1. One Exemplary Embodiment

According to the present invention, it is possible to extract a signal using one delay interferometer on the receiving side by periodically changing the frequency of an optical carrier on the transmission side, as described above. Description will be made below on a case where a transmission-side communication apparatus DQPSK-modulates an optical carrier while switching optical carrier frequency ν between $ν_1$ and $ν_2$ having frequency difference of $1/4τ$ therebetween every $τ/2$, i.e. half of symbol interval τ, as an example.

1.1) Configuration

Figure 2A:
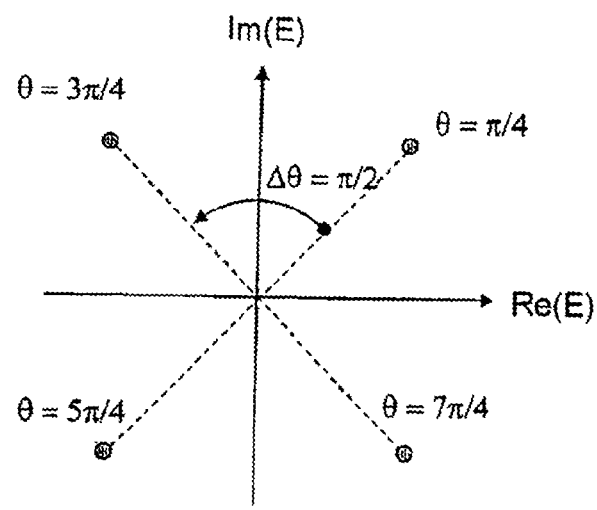
FIG. 2A is a signal constellation diagram showing the phase state of general DQPSK optical transmission signal Es(t)
Figure 3:
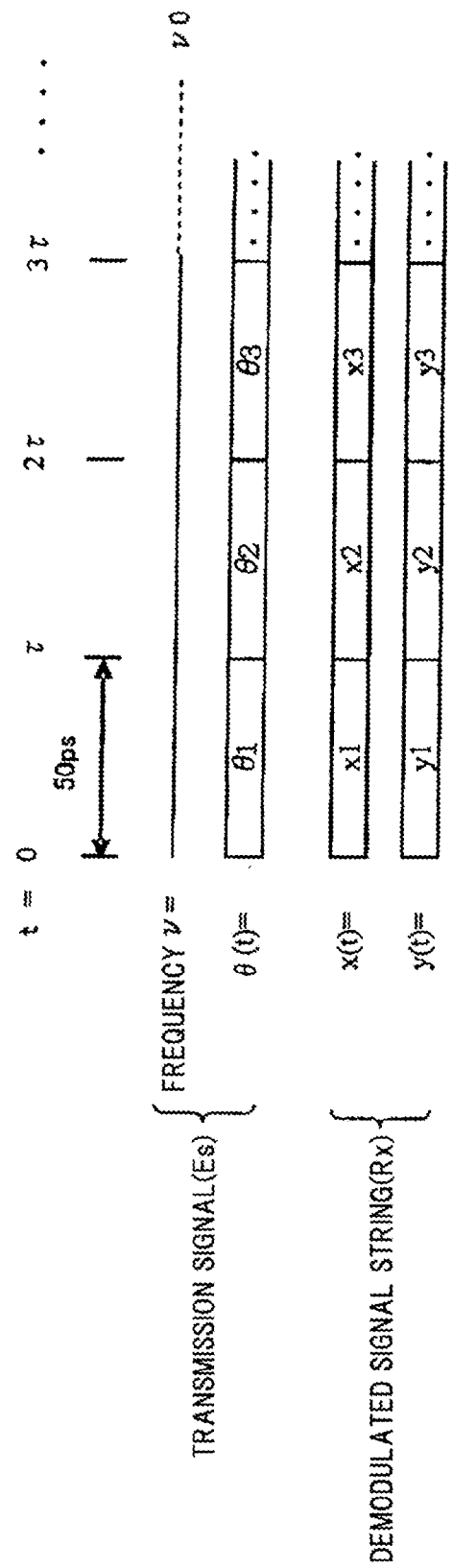
FIG. 3 is a time chart showing DQPSK optical transmission signal Es(t) and a demodulated signal Rx.
Figure 4:
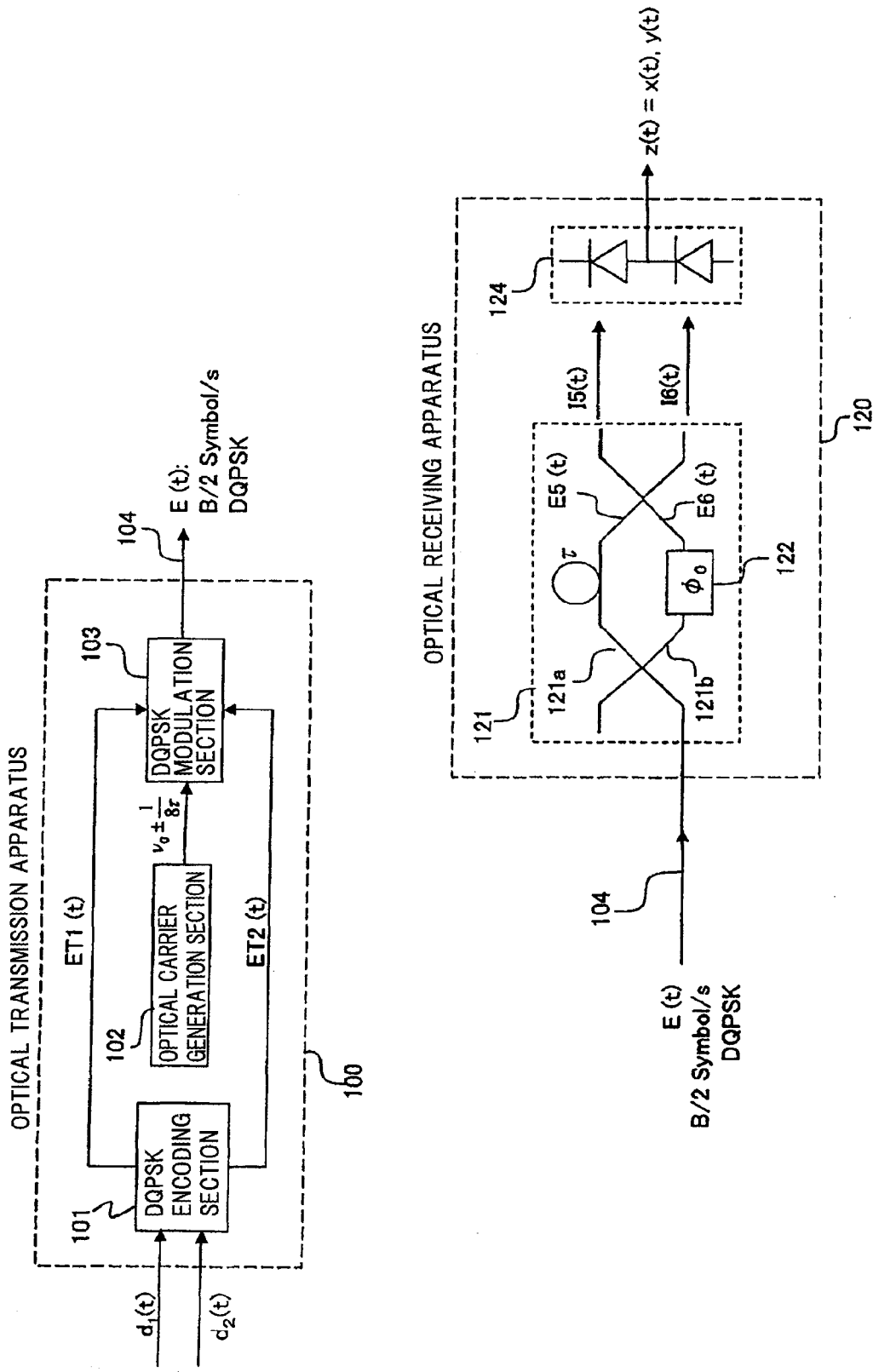
FIG. 4 is a block diagram showing a basic configuration of an optical communication system according to one exemplary embodiment.

FIG. 4 is a block diagram showing a basic configuration of an optical communication system according to one exemplary embodiment. The modulation system of optical transmission apparatus 100 in this exemplary embodiment is provided with DQPSK encoding section 101, optical carrier sending-out section 102 and DQPSK modulation section 103. Optical carrier sending-out section 102 outputs an optical carrier to DQPSK modulation section 103, switching frequencies $ν_1$ and $ν_2$ shifted by $±1/8τ$ relative to optical carrier frequency $ν_0$ on a cycle of $τ/2$.

The demodulation system of optical receiving apparatus 120 includes one delay interferometer 121 and one balancing-type photoelectric converter 124. Delay interferometer 121 is provided with an optical transmission path which makes delay time τ for one arm 121a. Fine-adjustment phase modulator 122 is provided for the other arm 121b. Delay time τ is realized by making the light path length of arm 121a physically longer than arm 121b. Delay time τ is equal to the symbol interval of data.

Here, optical transmission apparatus 100 as an optical communication apparatus on the transmission side and optical receiving apparatus 120 as an optical communication apparatus on the receiving side are separately described for convenience of description. However, one optical communication apparatus may be equipped with the modulation system of optical transmission apparatus 100 and the demodulation system of optical receiving apparatus 120. That is, it is also possible for an optical communication apparatus provided with the modulation system of optical transmission apparatus 100 and the demodulation system of optical receiving apparatus 120 to perform DQPSK optical transmission/receiving with other optical communication apparatuses provided with a similar modulation/demodulation circuit.

1.2) Modulation Operation on the Transmission Side

Figure 5A:
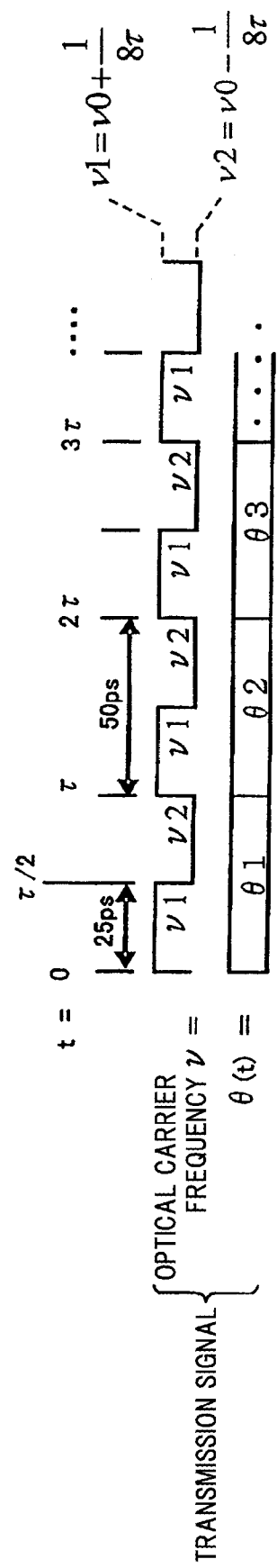
FIG. 5A is a time chart schematically showing the modulation operation on the transmission side.

FIG. 5A is a time chart schematically showing the modulation operation on the transmission side. The modulation operation in optical transmission apparatus 100 will be described below with reference to FIGS. 4 and 5A.

In optical transmission apparatus 100, DQPSK encoding section 101 performs encoding of transmitted data d1 and d2 corresponding to DQPSK modulation and outputs encoded signals ET1 and ET2 to DQPSK modulation section 103.

DQPSK modulation section 103 inputs an optical carrier the frequency of which switches between $ν_1=ν_0+1/8τ$ and $ν_2=ν_0-1/8τ$ on a cycle of $τ/2$, from optical carrier sending-out section 102, as shown in FIG. 5A. DQPSK modulation section 903 generates DQPSK signal E(t) by phase-modulating such an optical carrier in accordance with signals ET1 and ET2 at a symbol interval τ. DQPSK signal E(t) is expressed by the following expression (10).

[Expression 10]

$$E(t) = \exp\{i[2πνt + θ(t)]\} \quad (10)$$

$$\begin{cases} ν = ν_1 = ν_0 + \dfrac{1}{8τ} & \text{for} \quad τN < t < \dfrac{τ}{2}(2N+1) \\ ν = ν_2 = ν_0 - \dfrac{1}{8τ} & \text{for} \quad \dfrac{τ}{2}(2N+1) < t < τ(N+1) \end{cases}$$

Though phase information θ(t) of DQPSK signal E(t) generated in this way changes every τ, the frequency switches between $ν_1=ν_0+1/8τ$ and $ν_2=ν_0-1/8τ$ in time series during one symbol cycle τ.

1.3) Demodulation Operation on the Receiving Side

FIG. 5B is a time chart schematically showing a demodulation result on the receiving side. The demodulation operation in optical receiving apparatus 120 will be described below with reference to FIGS. 4 and 5B.

First, it is assumed that DQPSK signal E(t) expressed by expression (10) has arrived at optical receiving apparatus 120. As described above, the carrier frequency of DQPSK signal E(t) switches between $ν_1=ν_0+1/8τ$ and $ν_2=ν_0-1/8τ$ on the cycle of $τ/2$. First, description will be made on a case where the carrier with frequency $ν_1$ has arrived at delay interferometer 121.

The optical signal of an optical carrier with frequency $ν_1$ which has been inputted to delay interferometer 121 is branched into two. An optical signal on arm 121a side is delayed by τ and becomes delay optical signal E5(t). As for an optical signal on arm 121b side, the phase is fine-adjusted by fine-adjustment phase modulator 122 and becomes optical signal E6(t). Delay optical signal E5(t) and optical signal E6(t) are expressed by the following expressions (11).

[Expression 11]

$$E5(t) = e^{i\frac{π}{2}}\exp\{i[2πν_1(t-τ) + θ(t-τ)]\}$$
$$E6(t) = \exp\{i[2πν_1(t) + φ_0 + θ(t)]\} \quad (11)$$

As a result of delay interferometer 121 causing delayed optical signal E5(t) and optical signal E6(t) to interfere with each other, output lights with output optical signal strengths I5(t) and I6(t) are outputted from delay interferometer 121. Output optical signal strengths I5(t) and I6(t) are expressed as the following expressions (12).

[Expression 12]

$$I5 ∝ 1+\cos(2πν_1τ+θ_0+Δθ)$$

$$JI6 ∝ 1-\cos(2πν_1τ+θ_0+Δθ) \quad (12)$$

Here, $Δθ=θ(t)-θ(t-τ)$. Expressions (12) are expressions (3) in which $ν_0$ is replaced with $ν_1$, and the amount of phase shift $π/4$ is replaced with 0 in. Here, by substituting expression (10) in which $ν_1$ is expressed as a function of $ν_0$, the following expressions (13) are obtained.

[Expression 13]

$$I5 \propto 1 + \cos\left(2\pi\left(v_0 + \frac{1}{8\tau}\right)\tau + \phi_0 + \Delta\theta\right) = \\ 1 + \cos\left(2\pi v_0 \tau + \phi_0 + \frac{\pi}{4} + \Delta\theta\right)$$

$$I6 \propto 1 - \cos\left(2\pi\left(v_0 + \frac{1}{8\tau}\right) + \phi_0 + \Delta\theta\right) = \\ 1 - \cos\left(2\pi v_0 \tau + \phi_0 + \frac{\pi}{4} + \Delta\theta\right)$$ (13)

When expressions (3) and expressions (13) are compared, it is known that I5=I1 and I6=I2 are satisfied. That is, in delay interferometer 921 of the optical receiving apparatus described in FIG. 1, an interference result obtained by phase-shifting a received signal with carrier $v_0$ by $\pi/4$ by shorter arm 921*b* is equal to an interference result obtained by aligning the phase shift of shorter arm 121*b* with 0, for a signal with carrier $v_1$ expressed by expression (10).

Similarly, in a case where a carrier with frequency $v_2$ arrives at delay interferometer 121, output optical signal strengths I5(t) and I6(t) for $v=v_2$ in expression (10) are expressed as the following expressions (14).

[Expression 14]

$$I5 \propto 1 + \cos\left(2\pi\left(v_0 - \frac{1}{8\tau}\right)\tau + \phi_0 + \Delta\theta\right) = \\ 1 + \cos\left(2\pi v_0 \tau + \phi_0 - \frac{\pi}{4} + \Delta\theta\right)$$

$$I6 \propto 1 - \cos\left(2\pi\left(v_0 - \frac{1}{8\tau}\right)\tau + \phi_0 + \Delta\theta\right) = \\ 1 - \cos\left(2\pi v_0 \tau + \phi_0 - \frac{\pi}{4} + \Delta\theta\right)$$ (14)

When expressions (3) and expressions (14) are compared, it is known that I5=I3 and I6=I4 are satisfied. That is, in delay interferometer 922 of the optical receiving apparatus described in FIG. 1, an interference result obtained by phase-shifting a received signal with carrier frequency $v_0$ by $-\pi/4$ by shorter arm 922*b* is equal to an interference result obtained by aligning the phase shift of shorter arm 122*b* with 0, for a signal with carrier frequency $v_2$ expressed by the expression (10).

By using expressions (5), the following expression (15) is obtained from expressions (13) for carrier frequency $v_1$ and expressions (14) for carrier frequency $v_2$.

[Expression 15]

$$I5(t) - I6(t) \propto \begin{cases} \cos\left(\Delta\theta(t) + \frac{\pi}{4}\right) & \text{for } v = v_1 \\ \cos\left(\Delta\theta(t) - \frac{\pi}{4}\right) & \text{for } v = v_2 \end{cases}$$ (15)

From expressions (7) and (9), when balancing-type photoelectric converter 124 performs square-law detection of these to convert them to electrical signals, difference between I5 and I6 is converted to electrical signal z(t), and the following expression (16) is obtained.

[Expression 16]

$$z(t) = \begin{cases} x(t) & \text{for } v = v_1 \\ y(t) & \text{for } v = v_2 \end{cases}$$ (16)

That is, electrical signals x(t) and y(t) obtained from output lights from two delay interferometers 921 and 922 described in FIG. 1 are alternately obtained in a time-sharing state in z(t) obtained from an output light from one delay interferometer 121 shown in FIG. 4, and original signals d1 and d2 can be restored from these two signals.

1.4) Comparison

It is also possible to compare the relation between a carrier frequency and a delay interferometer in the demodulation system in this exemplary embodiment and that in the demodulation system shown in FIG. 1 from the viewpoint of filter characteristic, as shown below.

Figure 6A:
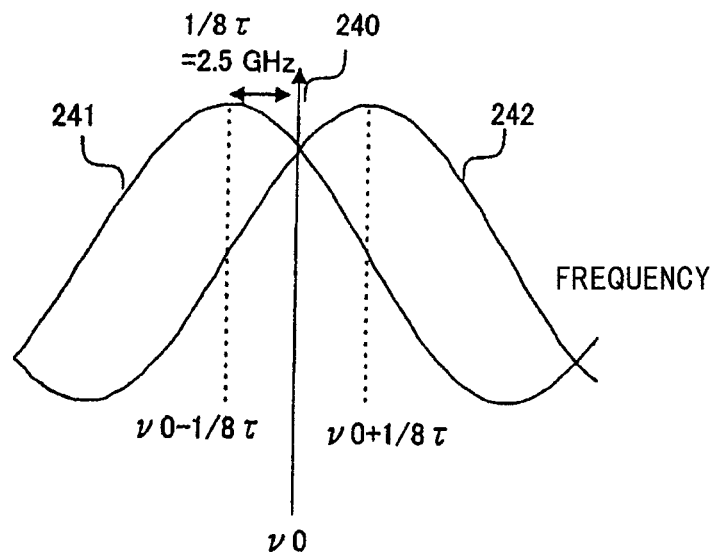
FIG. 6A is a diagram showing filter characteristic curves of two delay interferometers used in the scheme shown in FIG. 1, as a comparison example.
Figure 6B:
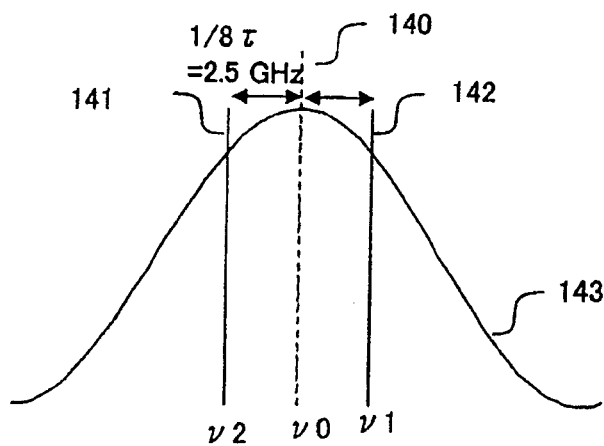
FIG. 6B is a diagram showing a filter characteristic curve of one delay interferometer used in this exemplary embodiment.

FIG. 6A is a diagram showing filter characteristic curves of two delay interferometers used in the scheme shown in FIG. 1, as a comparison example. FIG. 6B is a diagram showing a filter characteristic curve of one delay interferometer used in this exemplary embodiment.

In the demodulation system shown in FIG. 1, demodulation is performed by two delay interferometers 921 and 922 having filter characteristics 241 and 242 the peaks of which relative to a signal with carrier frequency $v_0$ are at $v_0 \pm \frac{1}{8}\tau$, respectively, as shown in FIG. 6A.

In contrast, in this exemplary embodiment, demodulation is performed by one delay interferometer 121 having filter characteristic 143 the peak of which, relative to a signal with carrier frequency $v_0 \pm \frac{1}{8}\tau$, is at $v_0$, as shown in FIG. 6B, and thereby, demodulation results similar to those of the demodulation system shown in FIG. 1 can be alternately obtained every $\tau/2$.

1.5) Advantage

According to this exemplary embodiment, it is possible to simplify the configuration of an optical receiving apparatus and facilitate miniaturization. The reason is that it is possible to demodulate a DQPSK-modulated signal only by providing one set of a delay interferometer and a balancing-type photoelectric converter for DQPSK demodulation. Since it is only necessary to use one set of a delay interferometer and a balancing-type photoelectric converter, the number of parts is reduced, and it is possible to facilitate manufacturing and to reduce the number of optical parts by half, concerning which a reduction is price is difficult to achieve.

Exemplary Embodiment 1

2. First Exemplary Embodiment

FIG. 7 is a block diagram showing an optical communication system according to a first exemplary embodiment. Here, specific description will be made on a case where a signal with transmission capacity B=40 G [bits/s], that is, a signal with a symbol interval of $\tau$=2/B=50 ps [picoseconds] is transmitted from optical transmission apparatus 300 to optical receiving apparatus 320.

2.1) Configuration

Optical transmission apparatus 300 is provided with encoding section 301, optical carrier generation section 302 and DQPSK modulation section 303. Encoding section 301 is the DQPSK encoding section already stated, and it performs encoding of transmitted data d1 and d2 corresponding to DQPSK modulation and outputs encoded signals ET1 and ET2 to DQPSK modulation section 303.

Optical carrier generation section 302 is provided with laser light source (laser diode) 305 which generates carrier Ein(t) 315 with single frequency $v_0$ and phase modulator 306 which performs phase modulation of this carrier. Phase modulator 306 can control the amount of phase variation $\Delta\Phi(t)$ in proportion to modulation voltage V(t). As described later, the frequency of carrier Eout(t) 316 outputted from phase modulator 306 shifts between $v_1 = v_0 + \frac{1}{8}\tau$ and $v_2 = v_0 - \frac{1}{8}\tau$ in time series.

DQPSK modulation section 303 is a general DQPSK modulator, and it is provided with optical splitter 307, Mach-Zehnder modulator 308, which is one arm, Mach-Zehnder modulator 309, which is the other arm, fixed phase adjuster 310 and optical coupling section 311.

Mach-Zehnder modulators 308 and 309 input optical signals branched by optical splitter 307 to themselves, respectively, and selectively modulate the phase by ±π radians by driving voltages in accordance with signals ET1 and ET2 from encoding section 301, respectively.

Fixed phase adjuster 310 is provided on one arm and gives a phase shift of π/2 to an optical signal. Optical coupling section 311 causes optical signals which have passed through both of the above arms to be coupled with each other to generate DQPSK signal E(t) 304 with 20G symbols/s.

Optical receiving apparatus 320 inputs received optical signal E(t) 304 to itself. Optical receiving apparatus 320 is provided with delay interferometer 321 and balancing-type photodetector 324 which function as a demodulator.

A Michelson interferometer or a Mach-Zehnder interferometer (MZI) can be used as delay interferometer 321. Here, an example of using a Michelson interferometer using a space optical system will be shown. Balancing-type photodetector 324 inputs two optical output signals I5 and I6 of delay interferometer 321 to itself and outputs electrical signal z(t) with a voltage in proportion to the difference in strength between the two optical output signals.

As already stated, by making arm 321a longer than arm 321b by a distance corresponding to delay time of τ=50 ps in delay interferometer 321, interference between a received optical signal and an optical signal one symbol before the signal becomes possible. Arm 321b is provided with fine-adjustment phase modulator 322.

2.2) Operation

Figure 8:
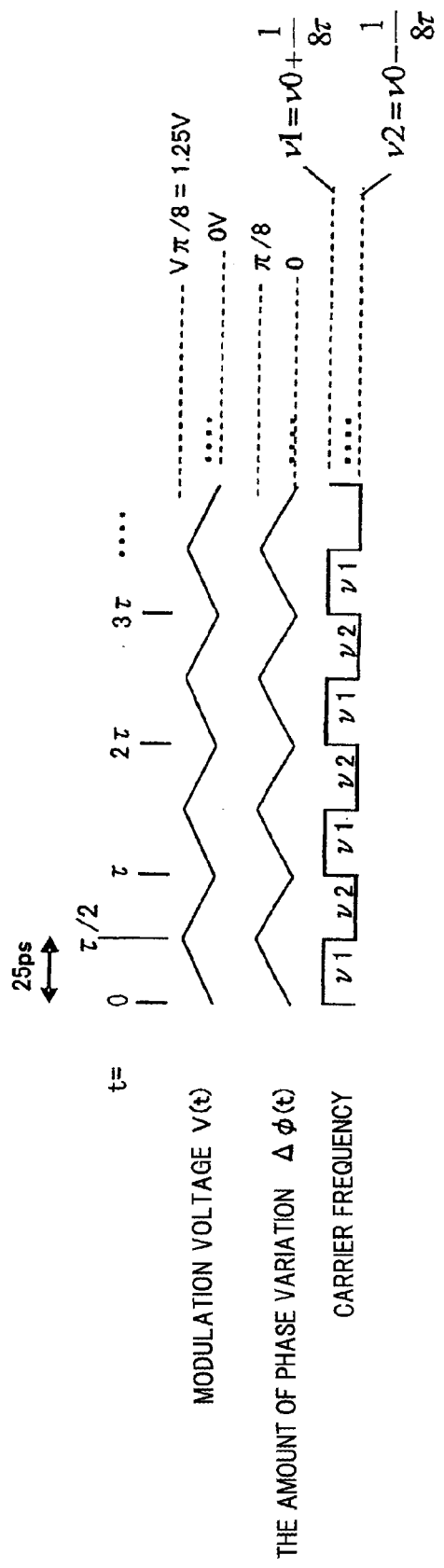
FIG. 8 is a time chart showing the operation of a modulation system of an optical transmission apparatus in FIG. 7.

FIG. 8 is a time chart showing the operation of the modulation system of an optical transmission apparatus in FIG. 7. Phase modulator 306 inputs optical carrier Ein(t) 315 with single frequency v0=194.00 THz from laser light source 305 to itself and outputs carrier Eout(t) 316 modulated according to modulation voltage V(t).

When modulation voltage Vπ of phase modulator 306 is 10 V, modulation voltage V(t) repeats voltage change in which the voltage linearly increases from 0 V to 1.25 V when t is between 0 ps and 25 ps, and linearly decreases from 1.25 V to 0 V when t is between 25 ps and 50 ps, on a cycle of 50 ps as shown in FIG. 8. Thereby, the amount of phase variation ΔΦ(t) in proportion to modulation voltage V(t) is given to carrier Eout(t) 316 outputted from phase modulator 306. By giving this linear phase variation, a frequency shift is generated. That is, optical instantaneous frequency is given by phase differential. When the phase linearly increases or decreases between 0 and π/8 at a time interval of 25 ps as shown in FIG. 8, the amount of frequency shift is given by the following expression (17).

[Expression 17]

$$\frac{1}{2\pi} \frac{d\Delta\phi(t)}{dt} = \frac{1}{2\pi} \frac{\frac{\pi}{8}}{2\pi} = 2.5 \text{ GHz} \quad (17)$$

This expression (17) corresponds to the amount of frequency shift of 1/8τ shown in expression (10).

DQPSK modulator 303 is a general DQPSK modulator as described above, and it DQPSK-modulates carrier Eout(t) 316 in accordance with DQPSK-modulating signals ET1(t) and ET2(t). DQPSK-modulating signals ET1(t) and ET2(t) are synchronized with modulation signal V(t) of phase modulator 306, and generated optical signal E(t) 304 is modulated so that symbol switching timing corresponds to carrier frequency switching timing.

Delay interferometer 321 and balancing-type photodetector 324 of optical receiving apparatus 320 input optical signal E(t) 304 to themselves and output output signal z(t) expressed by expression (15). In this way, through the use of one delay interferometer 321 being used, demodulated signal strings z(t) are sequentially outputted every τ/2 (25 ps).

Exemplary Embodiment 2

3. Second Exemplary Embodiment

Figure 9:
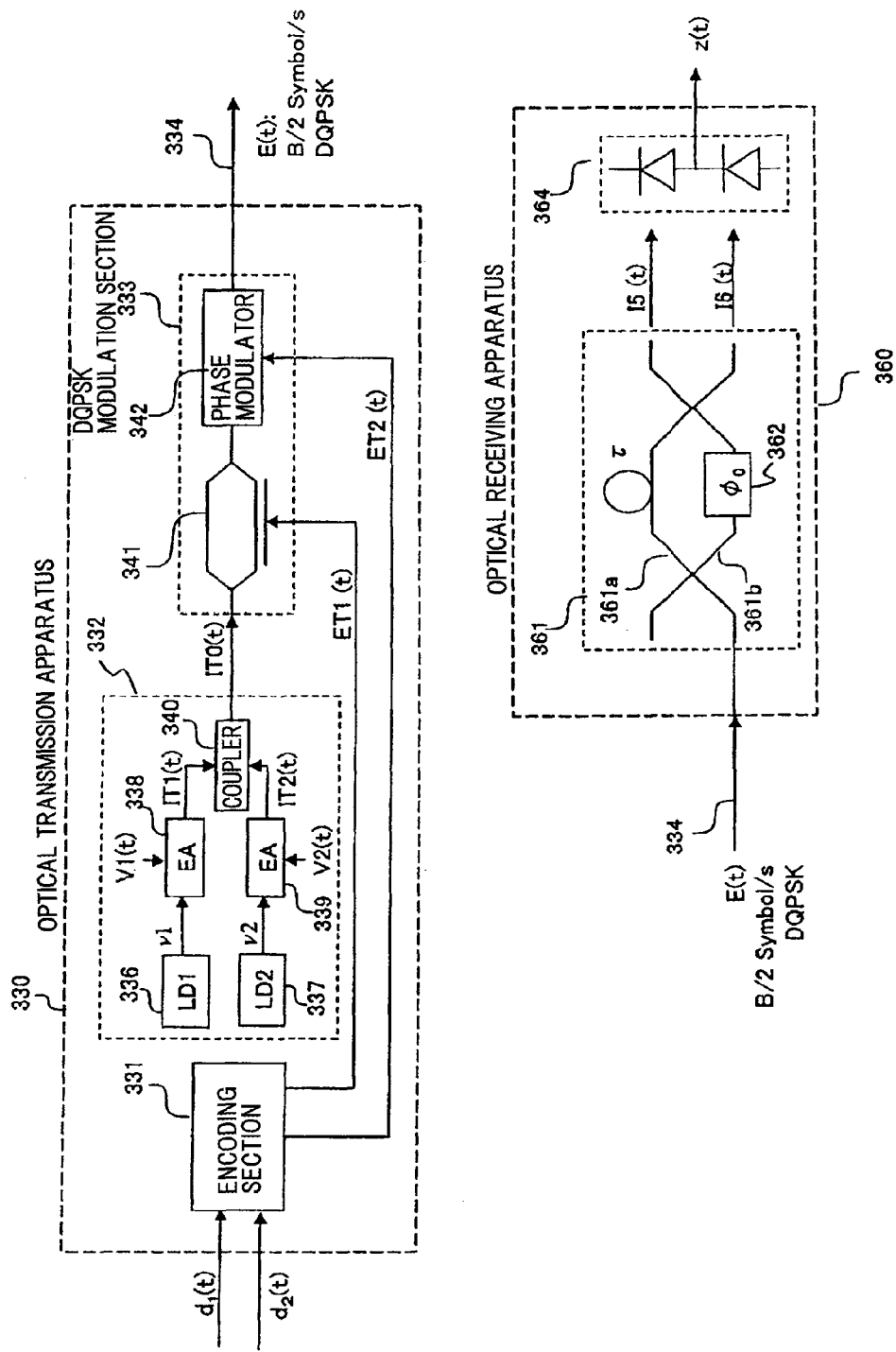
FIG. 9 is a block diagram showing an optical communication system according to a second exemplary embodiment.

FIG. 9 is a block diagram showing an optical communication system according to a second exemplary embodiment. Here, specific description will be made on a case where a signal with transmission capacity B=40 G [bit/s], that is, a signal with a symbol interval of τ=2/B=50 ps is transmitted from optical transmission apparatus 330 to optical receiving apparatus 360.

2.1) Configuration

Optical transmission apparatus 330 shown in FIG. 9 is provided with encoding section 331, optical carrier generation section 332 and DQPSK modulation section 333. Encoding section 331 is the DQPSK encoding section already stated, and it performs encoding of transmitted data d1 and d2 corresponding to DQPSK modulation and outputs encoded signals ET1(t) and ET2(t) to DQPSK modulation section 333.

Optical carrier generation section 332 is provided with two DFB (distributed feedback) lasers 336 and 337, two EA (electro-absorption) modulators 338 and 339, and photo coupler 340. EA modulators 338 and 339 are driven by driving voltages V1(t) and V2(t), respectively, and they are capable of causing an incident light to be transmitted or shut out according to a driving voltage value.

CW light with frequency $v_1$ outputted from DFB laser 336 is transmitted/shut out by EA modulator 338, and transmitted CW light is outputted to coupler 340. CW light with frequency $v_2$ outputted from DFB laser 337 is transmitted/shut out by EA modulator 339, and transmitted CW light is outputted to coupler 340. Thus, by causing EA modulators 338 and 339 to alternately perform transmission or shutout on a cycle of τ/2 by driving voltage V1(t) and V2(t), the frequency of carrier ETO(t) can be switched between $v_1$ and $v_2$.

DQPSK modulation section 333 has a general DQPSK modulation configuration. However, it is an example different from the first exemplary embodiment, and it is provided with Mach-Zehnder modulator 341 and phase modulator 342. Mach-Zehnder modulator 341 is configured so as to selectively modulate the phase by only ±π radians according to driving voltage. With an optical signal whose phase has been modulated to 0 or π by Mach-Zehnder modulator 341, as an input, phase modulator 342 further modulates the phase selectively by only ±π/2 radians according to driving voltage. DQPSK signal E(t) 334 in accordance with DQPSK-modulating signals ET1(t) and ET2(t) is generated by DQPSK modulation section 333 as described above.

Optical receiving apparatus 360 inputs received optical signal E(t) 334 to itself. Optical receiving apparatus 360 is provided with delay interferometer 361 and balancing-type photoelectric converter 364 which function as a demodulator. The case where a Mach-Zehnder interferometer (MZI) is used as delay interferometer 361 has been shown. Delay interferometer 361 can be manufactured, for example, with a single-mode fiber. It can also be manufactured with a silicon substrate, a glass substrate, gallium arsenide or lithium niobate. In this case, it is of a waveguide type. As already stated, by making arm 361a longer than arm 361b by a distance corresponding to delay time of T=50 ps in delay interferometer 361, interference between a received optical signal and an optical signal one symbol before the signal becomes possible. Arm 361b is provided with fine-adjustment phase modulator 362. Since the basic configurations and operations of delay interferometer 361 and balancing-type photodetector 364 are similar to those of the first exemplary embodiment, details thereof will be omitted.

2.2) Operation

Figure 10:
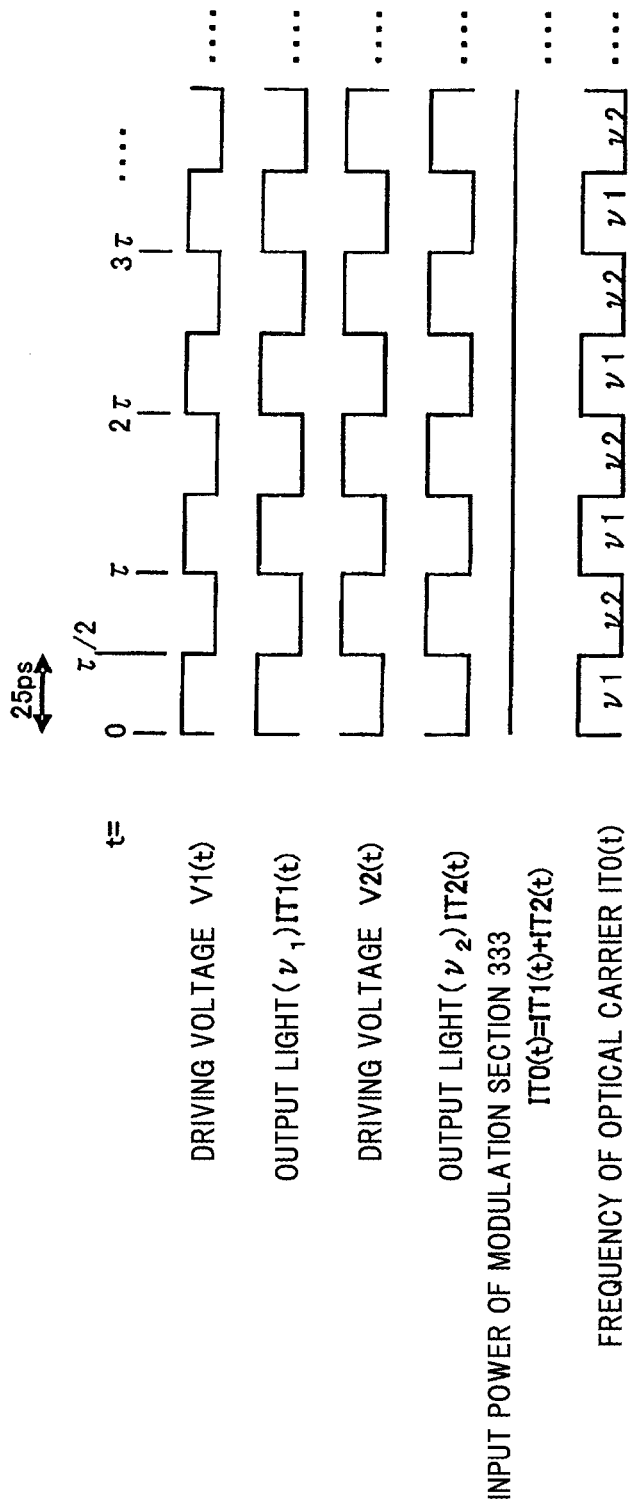
FIG. 10 is a time chart showing the operation of a modulation system of an optical transmission apparatus in FIG. 9.

FIG. 10 is a time chart showing the operation of the modulation system of the optical transmission apparatus in FIG. 9. DFB lasers 336 and 337 output two CW lights with optical carrier frequencies of $v_1=194.0025$ THz and $v_2=193.9975$ THz, respectively.

Driving voltages V1(t) and V2(t) are controlled so that EA modulator 339 is in a shutout state when EA modulator 338 is in a transmission state, and, on the contrary, EA modulator 339 is in a transmission state when EA modulator 338 is in a shutout state. That is, EA modulator driving voltages V1(t) and V2(t) are synchronized and operate in reverse phases, and thereby, both output light IT1(t) from EA modulator 338 and IT2(t) from EA modulator 339 also repeat ON/OFF in reverse phases. Therefore, output lights IT1(t) and IT2(t) are temporally alternately multiplexed by optical coupler 340 and outputted to DQPSK modulation section 333 as carrier IT0(t). As shown in FIG. 10, the light strength of the carrier IT0(t) is constant, and the carrier frequency switches every $\tau/2=25$ ps.

DQPSK modulator 333 is a general DQPSK modulator as described above, and it DQPSK-modulates carrier IT0(t) in accordance with DQPSK-modulating signals ET1(t) and ET2(t). DQPSK-modulating signals ET1(t) and ET2(t) are synchronized with EA modulator driving voltages V1(t) and V2(t), and generated optical signal E(t) 334 is modulated so that symbol switching timing corresponds to carrier frequency switching timing.

Delay interferometer 361 and balancing-type photodetector 364 of optical receiving apparatus 360 input optical signal E(t) 334 and output output signal z(t) expressed by expression (15). In this way, demodulated signal strings z(t) are sequentially outputted by one delay interferometer 361 every $\tau/2$ (25 ps).

Exemplary Embodiment 3

4. Third Exemplary Embodiment

FIG. 11 is a block diagram showing an optical communication system according to a third exemplary embodiment. Here, specific description will be made on a case where a signal with transmission capacity B=40 G [bits/s], that is, a signal with a symbol interval of $\tau=2/B=50$ ps is transmitted from optical transmission apparatus 370 to optical receiving apparatus 360. The same reference numerals are given to blocks having the same functions as those in second exemplary embodiment described in FIG. 9.

Optical transmission apparatus 370 shown in FIG. 11 is provided with encoding section 371, optical carrier generation section 372 and DQPSK modulation section 373. Encoding section 371 is the DQPSK encoding section already stated, and it performs encoding of transmitted data d1 and d2 corresponding to DQPSK modulation and outputs encoded signals ET1(t) and ET2(t) to DQPSK modulation section 373.

Optical carrier generation section 372 is provided with two DFB (distributed feedback) lasers 336 and 337 and optical switch 377. CW light with frequency $v_1$ (e.g. 194.0025 GHz) and CW light with frequency $v_2$ (e.g. 193.9975 GHz) outputted from DFB lasers 336 and 337, respectively, enter two input ports of optical switch 377, respectively. Optical switch 377 can optically connect the two input ports alternately to an output port, by control signal V3(t). Thus, by controlling control signal V3(t), optical carrier generation section 372 can switch the carrier frequency alternately between $v_1$ and $v_2$ every $\tau/2=25$ ps.

DQPSK modulation section 373 is a configuration example in which two phase modulators 378 and 379 are cascade-connected. Phase modulator 378 is configured so as to selectively modulate the phase by only $\pm\pi$ radians according to driving voltage. With an optical signal the phase of which has been modulated to 0 or $\pi$ by phase modulator 378 as an input, phase modulator 379 selectively modulates the phase by only $\pm\pi/2$ radians to generate a DQPSK signal having phase states of four values according to driving voltage. DQPSK signal E(t) 374 in accordance with DQPSK-modulating signals ET1(t) and ET2(t) is generated by DQPSK modulation section 373 as described above. Other operations are similar to those in the second exemplary embodiment.

Optical receiving apparatus 360 has the same configuration as the second exemplary embodiment shown in FIG. 9, and the operation is also the same. Therefore, the same reference numerals are given, and description thereof will be omitted.

The present invention is applicable to an optical communication apparatus using a DQPSK modulation/demodulation method and an optical communication system including the optical communication apparatus. It is preferably applied especially to an asymmetric optical communication system, such as a PON (passive optical network), in which miniaturization of a receiving apparatus is important.

The present invention has been described with reference to exemplary embodiments. However, the present invention is not limited to the exemplary embodiments. It is possible to make various changes to the configuration and details of the present invention defined in the claims, within the scope of the present invention, so that a person skilled in the art would readily understand the present invention.

This application claims the benefit of priority on the basis of Japanese Patent Application No. 2008-040867 filed on Feb. 22, 2008, the disclosure of which is all incorporated herein by reference.

The invention claimed is:

1. An optical communication system using a DQPSK (differential quadrature phase-shift keying) scheme, comprising:
    a transmission-side communication apparatus generating an optical carrier the frequency of which switches among a plurality of different frequencies within one symbol period and DQPSK-modulating the optical carrier according to a modulation signal at an interval of the symbol period; and
    a receiving-side communication apparatus receiving an optical signal DQPSK-modulated by the transmission-side communication apparatus, causing the received optical signal and a delay optical signal delayed by a predetermined time relative to the optical signal to interfere with each other, and converting the optical signals caused to interfere with each other to electrical signals.

2. The optical communication system according to claim 1, wherein the transmission-side communication apparatus generates the optical carrier being switched between two frequencies which are different from each other by $1/4\tau$ when one symbol period is indicated by $\tau$.

3. The optical communication system according to claim 2, wherein the receiving-side communication apparatus causes the optical signal and the delay signal delayed by the one symbol period relative to the optical signal to interfere with each other.

4. The optical communication system according to claim 3, wherein the transmission-side communication apparatus generates two continuous waves the frequencies of which are different from each other by $1/4\tau$, periodically performs transmission and shutout of the continuous waves in reverse phases, and generates the optical carrier by multiplexing transmitted continuous lights.

5. The optical communication system according to claim 4, wherein the transmission-side communication apparatus uses two EA (electro-absorption) modulators to perform transmission and shutout of the continuous waves, respectively.

6. The optical communication system according to claim 2, wherein the transmission-side communication apparatus further comprises a light source for generating a continuous wave with a predetermined frequency, and generates the optical carrier being switched between the two different frequencies by linearly increasing or decreasing the amount of phase variation of the generated continuous wave.

7. The optical communication system according to claim 2, wherein the transmission-side communication apparatus further comprises two continuous-wave light sources for generating continuous waves with the different frequencies, respectively, and generates the optical carrier being switched between the different two frequencies by selectively transmitting the continuous waves generated by the two continuous-wave light sources and outputting the transmitted continuous waves.

8. The optical communication system according to claim 2, wherein the transmission-side communication apparatus switches the frequency of the optical carrier at an interval of $\tau/2$.

9. An optical communication method using a DQPSK (differential quadrature phase-shift keying) scheme, comprising:
generating an optical carrier whose frequency switches among a plurality of different frequencies within one symbol period;
DQPSK modulating the optical carrier according to a modulation signal at an interval of the symbol period; and
receiving an optical signal with DQPSK-modulation format, the received optical signal and a delay optical signal delayed by a predetermined time relative to the optical signal are caused to interfere with each other, and the optical signals caused to interfere with each other are converted to electrical signals.

10. The optical communication method according to claim 9, wherein
the optical signal that is switched between two frequencies which are different from each other by $1/4\tau$ when one symbol period indicated by $\tau$.

11. The optical communication method according to claim 10, wherein the optical signal and the delay signal delayed by one symbol period relative to the optical signal are caused to interfere with each other.

12. The optical communication method according to claim 10, wherein
the optical carrier whose frequency is switched at an interval of $\tau/2$ is generated.

13. An optical communication apparatus using a DQPSK (differential quadrature phase-shift keying) scheme, comprising:
optical carrier generation means for generating an optical carrier the frequency of which switches among a plurality of different frequencies within one symbol period; and
modulation means for DQPSK-modulating the optical carrier generated by the optical carrier generation means in accordance with a modulation signal at an interval of the symbol period.

14. The optical communication apparatus according to claim 13, wherein in that the optical carrier generation means generates the optical carrier being switched between two frequencies which are different from each other by $1/4\tau$ when the symbol period is indicated by $\tau$.

15. The optical communication apparatus according to claim 14, wherein the optical carrier generation means generates the optical carrier the frequency of which is switched at an interval of $\tau/2$.

16. The optical communication apparatus according to claim 13, wherein
the optical carrier generation means comprises:
two continuous-wave light sources for generating continuous waves with the two frequencies, respectively;
transmission/shutout control means for periodically performing transmission and shutout of the continuous waves generated by the two continuous-wave light sources in reverse phases; and
multiplexing means for multiplexing output lights from the transmission/shutout control means to output the optical carrier.

17. The optical communication apparatus according to claim 16, wherein the transmission/shutout control means comprises two EA (electro-absorption) modulators connected to the two continuous-wave light sources, respectively.

18. The optical communication apparatus according to claim 13, wherein
the optical carrier generation means comprises:
a continuous-wave light source for generating a continuous wave with a predetermined frequency; and
phase modulation means for outputting the continuous wave with the two frequencies by linearly increasing or decreasing the amount of phase variation of the continuous wave generated by the continuous-wave light source.

19. The optical communication apparatus according to claim 13, wherein
the optical carrier generation means comprises:
two continuous-wave light sources for generating two continuous waves with two frequencies, respectively; and
optical switching means for selectively transmitting the two continuous waves generated by the two continuous-wave light sources and outputting the transmitted continuous waves as the optical carrier.

20. An optical communication apparatus using a DQPSK (differential quadrature phase-shift keying) scheme, comprising:
single delay interference means for receiving an optical signal obtained by DQPSK-modulating an optical carrier the frequency of which switches among a plurality of different frequencies within one symbol period and for outputting an output light obtained by causing the optical signal and a delay optical signal thereof to interfere with each other; and
photoelectric conversion means for converting the output light outputted by the delay interference means to an electrical signal.

21. The optical communication apparatus according to claim 20, wherein the delay interference means comprises delay means for delaying the delay optical signal by said one symbol period relative to the optical signal with which the delay optical signal interferes.

22. The optical communication apparatus according to claim 20, wherein the frequency of the optical carrier is switched at an interval of $\tau/2$ when the symbol period is indicated by $\tau$.

23. An optical communication apparatus comprising a transmission system circuit and receiving system circuit using a DQPSK (differential quadrature phase-shift keying) scheme, the apparatus being characterized in that:
the transmission system circuit generates an optical carrier the frequency of which switches among a plurality of different frequencies within one symbol period and DQPSK-modulates the optical carrier according to a modulation signal at an interval of the symbol period; and
the receiving system circuit outputs an output light obtained by causing a received DQPSK-modulated optical signal and a delay optical signal thereof to interfere with each other and comprises photoelectric conversion means for converting the output light to an electrical signal.

24. The optical communication apparatus according to claim 23, wherein the receiving system circuit generates the optical carrier being switched between two frequencies which are different from each other by $1/4\tau$.

25. The optical communication apparatus according to claim 24, wherein the receiving system circuit generates the optical carrier the frequency of which is switched at an interval of $\tau/2$.

\* \* \* \* \*